United States Patent
Gurevitz et al.

(10) Patent No.: US 10,841,799 B2
(45) Date of Patent: Nov. 17, 2020

(54) NULL DATA PACKET (NDP) STRUCTURE FOR SECURE SOUNDING

(71) Applicant: Intel IP Corporation, Santa Clara, CA (US)

(72) Inventors: Assaf Gurevitz, Ramat Hasharon (IL); Robert Stacey, Portland, OR (US); Jonathan Segev, Tel Mond (IL); Qinghua Li, San Ramon, CA (US); Danny Alexander, Neve Efraim Monoson (IL); Shlomi Vituri, Tel Aviv (IL); Feng Jiang, Santa Clara, CA (US)

(*) Notice: Subject to any disclaimer, the term of this patent is extended or adjusted under 35 U.S.C. 154(b) by 0 days.

(21) Appl. No.: 16/451,822

(22) Filed: Jun. 25, 2019

(65) Prior Publication Data

US 2019/0342757 A1 Nov. 7, 2019

Related U.S. Application Data

(63) Continuation of application No. 16/146,931, filed on Sep. 28, 2018, now abandoned.

(60) Provisional application No. 62/578,763, filed on Oct. 30, 2017.

(51) Int. Cl.
| | |
|---|---|
| H04M 1/66 | (2006.01) |
| H04M 1/68 | (2006.01) |
| H04M 3/16 | (2006.01) |
| H04W 12/08 | (2009.01) |
| H04L 27/26 | (2006.01) |
| H04W 64/00 | (2009.01) |
| G01S 5/14 | (2006.01) |
| H04W 12/12 | (2009.01) |
| H04L 5/00 | (2006.01) |
| H04L 25/02 | (2006.01) |
| H04W 84/12 | (2009.01) |
| H04L 25/03 | (2006.01) |

(52) U.S. Cl.
CPC .............. *H04W 12/08* (2013.01); *G01S 5/14* (2013.01); *H04L 5/0048* (2013.01); *H04L 25/0226* (2013.01); *H04L 27/2605* (2013.01); *H04L 27/2613* (2013.01); *H04W 12/12* (2013.01); *H04W 64/00* (2013.01); *H04L 5/005* (2013.01); *H04L 5/0007* (2013.01); *H04L 25/03866* (2013.01); *H04W 84/12* (2013.01)

(58) Field of Classification Search
CPC ..... H04W 4/029; H04W 4/027; H04W 72/02; H04M 1/72519; H04M 1/72522; H04M 2250/12; H04M 2250/52; H04M 1/72563; H04M 1/72583
USPC ................................................ 455/411, 556.1
See application file for complete search history.

(56) References Cited

U.S. PATENT DOCUMENTS

| | | | | |
|---|---|---|---|---|
| 6,741,757 | B1* | 5/2004 | Torr ................... | G06K 9/00154 382/285 |
| 2010/0214410 | A1* | 8/2010 | McClure ............ | G08B 13/1961 348/143 |
| 2011/0279650 | A1* | 11/2011 | Liao ..................... | G06T 7/41 348/46 |

(Continued)

*Primary Examiner* — Joseph Arevalo

(57) ABSTRACT

Methods and apparatuses for arranging sounding symbol are provided. An example apparatus comprises memory; and processing circuitry coupled to the memory. The processing circuitry is configured to encode a sounding signal. The sounding signal comprises a plurality of sounding symbols, and the repetition of sounding symbols to be transmitted in sequence is avoided.

14 Claims, 19 Drawing Sheets

(56) References Cited

U.S. PATENT DOCUMENTS

| | | | |
|---|---|---|---|
| 2013/0155235 A1* | 6/2013 | Clough | G06K 9/0063 |
| | | | 348/144 |
| 2014/0089243 A1* | 3/2014 | Oppenheimer | G06F 21/50 |
| | | | 706/46 |
| 2014/0313345 A1* | 10/2014 | Conard | G06K 9/00664 |
| | | | 348/169 |
| 2015/0223442 A1* | 8/2015 | Yamauchi | A01M 1/026 |
| | | | 43/121 |
| 2016/0132750 A1* | 5/2016 | Yang | G06F 16/56 |
| | | | 382/197 |
| 2017/0070933 A1* | 3/2017 | Hagiwara | G06F 9/5077 |
| 2018/0189642 A1* | 7/2018 | Boesch | G06N 3/0454 |
| 2018/0287826 A1* | 10/2018 | Lindskog | H04L 25/0226 |
| 2019/0025854 A1* | 1/2019 | Rohani | G05D 1/0088 |

\* cited by examiner

US 10,841,799 B2

NULL DATA PACKET (NDP) STRUCTURE FOR SECURE SOUNDING

REFERENCE TO RELATED APPLICATION

This application is a continuation of U.S. Non-Provisional application Ser. No. 16/146,931, filed Sep. 28, 2018, which claims the benefit of U.S. Provisional Application No. 62/578,763 filed on Oct. 30, 2017, the contents of which are herein incorporated by reference in their entirety.

BACKGROUND

Null data packet (NDP) has been adopted as a sounding signal. However, the details about the sounding signal are missing. Especially for multiuser (MU) downlink sounding, no solution was discussed.

A P-matrix structure defined in IEEE 802.11n/ac/ax or 802.11mc specification fails to be reused for secure MU downlink sounding. In the case of such P-matrix structure is used, if one of the users is an attacker, other users are vulnerable to security attacks.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION OF EMBODIMENTS

Figure 1:
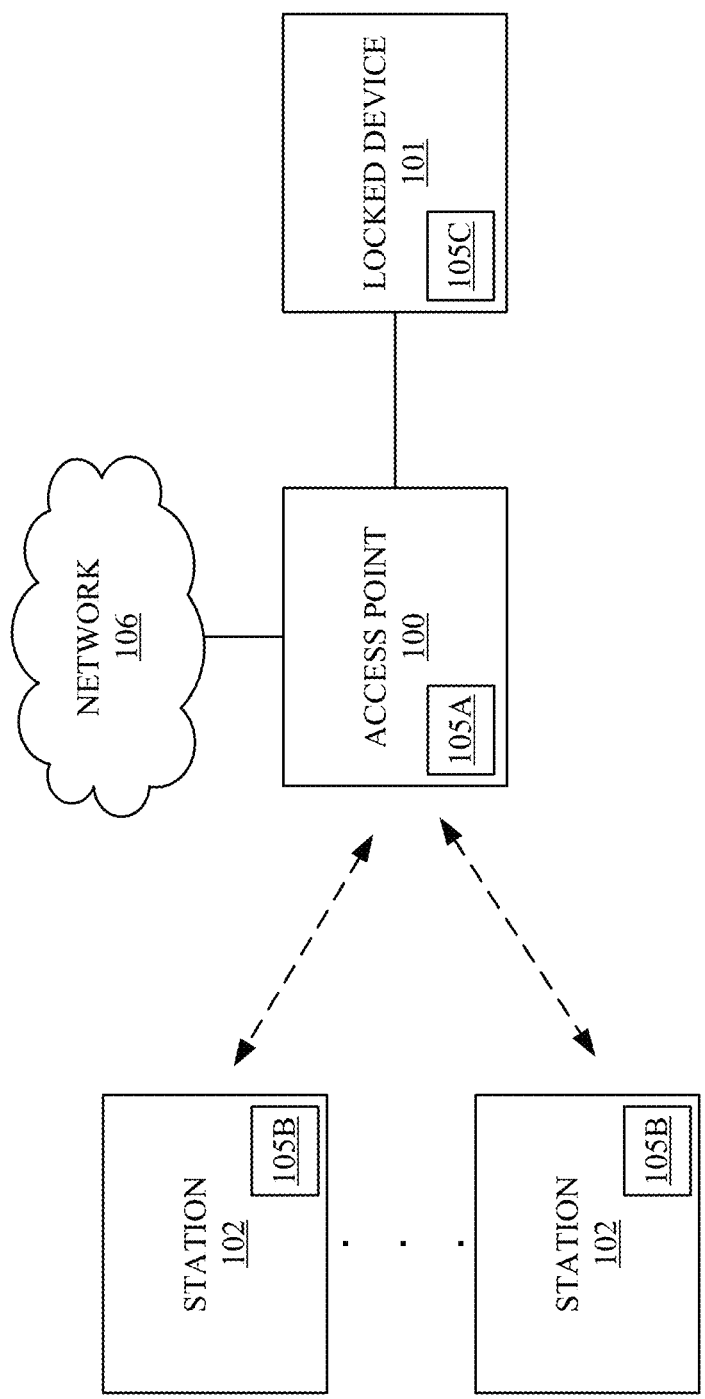
FIG. 1 is an illustration of the transmission of communications in a wireless local area network (WLAN) using Wi-Fi protocols between an example access point (AP) and example stations (STAs) in accordance with some examples.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "a set of" can be interpreted as "one or more".

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 is an illustration of the transmission of communications in a WLAN using Wi-Fi protocols between an example AP 100 and example STAs 102 in accordance with some examples. The example AP 100 includes an example radio architecture 105A. The example STAs 102 each includes an example radio architecture 105B. Although FIG. 1 shows two STAs 102, the number of the example STAs 102 is not limited, that is there can be more or less example STAs 102. FIG. 1 further includes an example network 106 and an example locked device 101.

The example AP 100 of FIG. 1 is a device that allows the example STAs 102 to wirelessly access the example network 106. The example AP 100 may be a router, a modem-router, and/or any other device that provides a wireless connection to a network. A router provides a wireless communication link to a STA. The router may access the network through a wire connection via a modem. A modem-router combines the functionalities of the modem and the router. The example AP 100 may include the example radio architecture 105A. The example radio architecture 105A may wirelessly transmit and receive data based on instructions from a processor. The example radio architecture 105A is further described below in conjunction with FIG. 14.

The example STAs 102 of FIG. 1 are Wi-Fi enabled computing devices. The example STAs 102 may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device. The example STAs 102 may include the example radio architecture 105B and/or other processors (e.g., the example application processor 1410 of FIG. 14). The example radio architecture 105B is further described below in conjunction with FIG. 14.

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example Wi-Fi AP 100 includes a communication interface that enables a connection to an Ethernet, a digital subscriber line (DSL), a telephone line, a coaxial cable, or any wireless connection, etc.

The example locked device 101 of FIG. 1 is a network enabled device, which can be locked and unlocked by the example STA(s) 102. The example locked device 101 includes a communication interface, such as an example radio architecture 105C, that enables a connection to an Ethernet, a digital subscriber line (DSL), a telephone line, a coaxial cable, or any wireless connection, etc.

In an example scenario, the example locked device 101 may be implemented as a locked door. The example STA(s) 102 aims to unlock the locked door. The distance between the example STA(s) 102 and the locked door and/or the distance between the example STA(s) 102 and the example AP 100 is an important reference value for the unlocking. For example, the door will be open automatically, if the distance between the example STA 102 and the locked door is less than 5 meters, and/or if the distance between the example STA 102 and the example AP 100 is less than 7 meters. In order to range (i.e., measure) the distance between the example STA 102 and the example AP 100 (or the example locked device 101), a sounding procedure is used.

Figure 2:
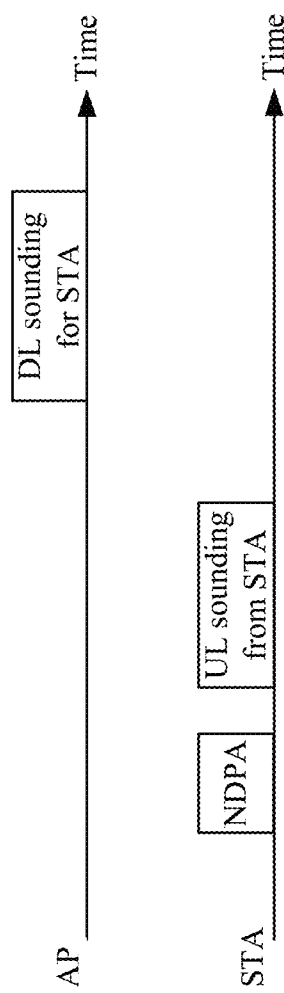
FIG. 2 illustrates an example sounding procedure for ranging the distance between one example STA and the example AP in accordance with some examples.

FIG. 2 illustrates an example sounding procedure for ranging the distance between one example STA 102 and the example AP 100 in accordance with some examples. In the example procedure, the example STA 102 firstly sends a Null Data Packet Announcement (NDPA) message, which may announce to the example AP 100 about the coming Null Data Packet (NDP) and indicate to the example AP 100 about how to respond to the NDP. Then, the example STA 102 sends an uplink (UL) sounding to the example AP 100. Then, upon receiving the UL sounding, the example AP 100 may send a downlink (DL) sounding as a response.

Figure 3:
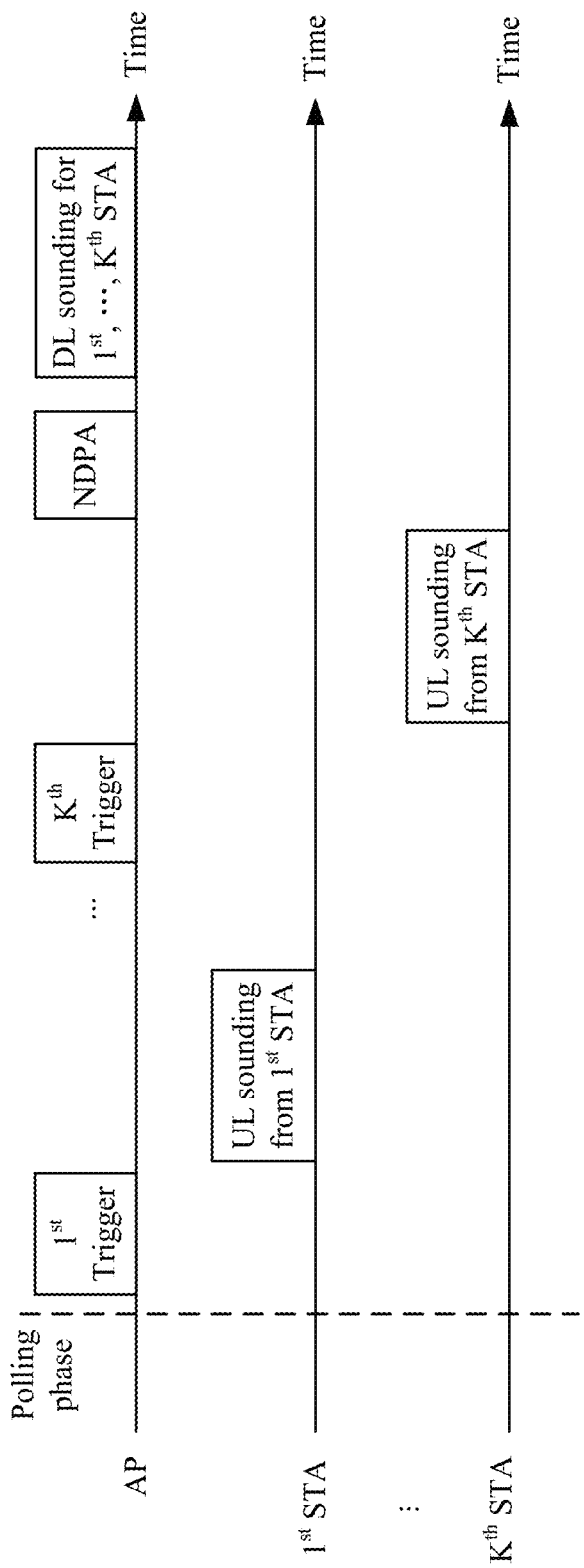
FIG. 3 illustrates an example sounding procedure for ranging the distance between more than one (for example K) example STAs and the example AP in accordance with some examples.

FIG. 3 illustrates an example sounding procedure for ranging the distance between more than one (for example K) example STAs 102 and the example AP 100 in accordance with some examples. In the polling phase, the example AP 100 polls the example STAs 102 and finds the first STA, the second STA, . . . , the $K^{th}$ STA. Then, the example AP 100 may send trigger signal to each of the example STAs 102 in sequence, to trigger the UL sounding from each of the example STAs 102. In response, each of the example STAs 102 sends an UL sounding to the example AP 100. After the example AP 100 solicits UL soundings from the all example STAs 102, the example AP 100 sends an NDPA, which may indicate the structure of the coming DL sounding. Furthermore, the sounding symbol allocations for the STAs may be indicated in the NDPA so that the STAs know where to find their sounding symbols. The sounding symbols with the zero prefix or padding are placed right next to each other instead of Short Interframe Space (SIFS) apart for high efficiency.

Although FIGS. 2-3 show the example sounding procedures between one or more example STAs 102 and the example AP 100, the sounding procedure also can be performed between any two or more entities. For example, in ranging mode, the example locked device 101 may act as an AP (or STA) as shown in FIGS. 2-3, and the example STAs 102 may act as a STA (or AP) as shown in FIGS. 2-3. For example, the door or the monitor may act as an AP as shown in FIGS. 2-3, which sends out Wi-Fi beacons and wants the user device to get associated with. The unlocking operation is based on the distance between the ranging devices e.g. AP and STA as shown in FIGS. 2-3 (or two STAs in mesh mode). Furthermore, in positioning mode, the AP(s) as shown in FIGS. 2-3 may reside in a plurality of network nodes, and the user device (STA) may measure the distance between itself and the plurality of network nodes, in order to position the AP(s). The AP(s) as shown in FIGS. 2-3 know the position of the user device after the measurements. The unlocking operation is based on the position.

In the above example sounding procedure illustrated in FIGS. 2-3, the STA(s) may record the time of departure (ToD) t1 of the UL sounding and the time of arrival (ToA) t4 of the DL sounding; while the AP may record the ToA t2 of the UL sounding and the ToD t3 of the DL sounding. The STA(s) and the AP may use any technical measure well known in this art such as time stamp to perform the recording.

The recorded time t1-t4 may be collected by any one or more of the AP and the STA(s) as shown in FIGS. 2-3, to calculate the distance between the AP and the STA(s). Besides, for safety purpose, one STA should not collect the data related to other STA(s). For example, if the AP calculates the distance, the STA(s) will send the recorded t1 and t4 to the AP. Besides, if the STA(s) calculates the distance, the AP will send the recorded respective t2 and t3 to the respective STA. After obtaining the time t1-t4, any one or more of the AP and the STA(s) as shown in FIGS. 2-3 may calculate the round trip time (RTT) as RTT=t4−t1−(t3−t2), and calculate the distance as c*RTT/2, wherein c is the speed of light.

If the calculated distance is less than a predetermined distance, or the calculated RTT is less than a predetermined time, any one or more of the AP and the STA(s) as shown in FIGS. 2-3 may generate an unlocking instruction, and unlock the example locked device 101 (e.g., locked door or locked screen) accordingly. In one scenario, the door will be open automatically, if the calculated distance between any of the example STA(s) 102 and the example locked device 101 is less than 5 meters, or the calculated RTT is less than 33 nanoseconds.

The above ranging procedure, for example, the sounding procedure may be affected by a potential attacker. The attacker may broadcast an interference or replayed signal, which is superposed on the sounding single on the receiver's antenna, or send it to the aimed receiver. Then, at the receiver, the ToA, such as t2 or t4, of the sounding signal may be disturbed. For example, the superposed signal may arrive earlier than the sounding signal, which makes the recorded t2 and/t4 less than the actual ToA. As a result, the calculated distance or RTT may become smaller than the actual one. In one scenario, the calculated distance is 4 m while the intended person is 24 m away from the door, that is, the door may be open incorrectly, which give chance to the attacker.

Figure 4:
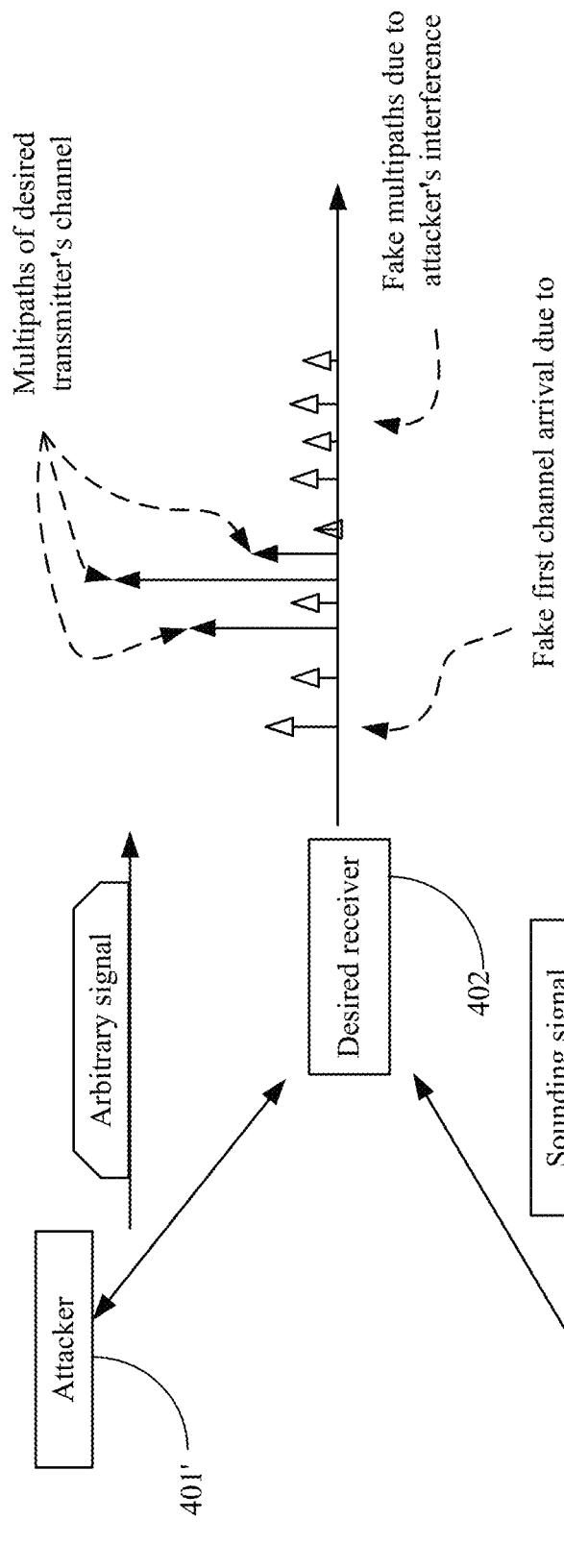
FIG. 4 illustrates a scenario of interfering attack.
Figure 5:
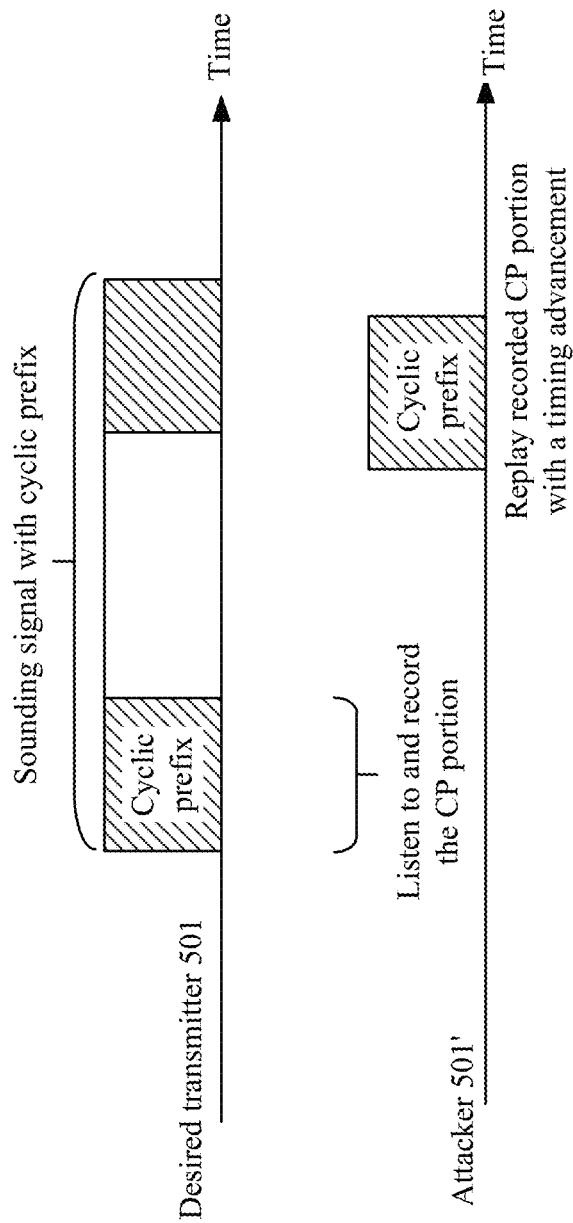
FIG. 5 illustrates a scenario of cyclic prefix (CP) replay attack.
Figure 6:
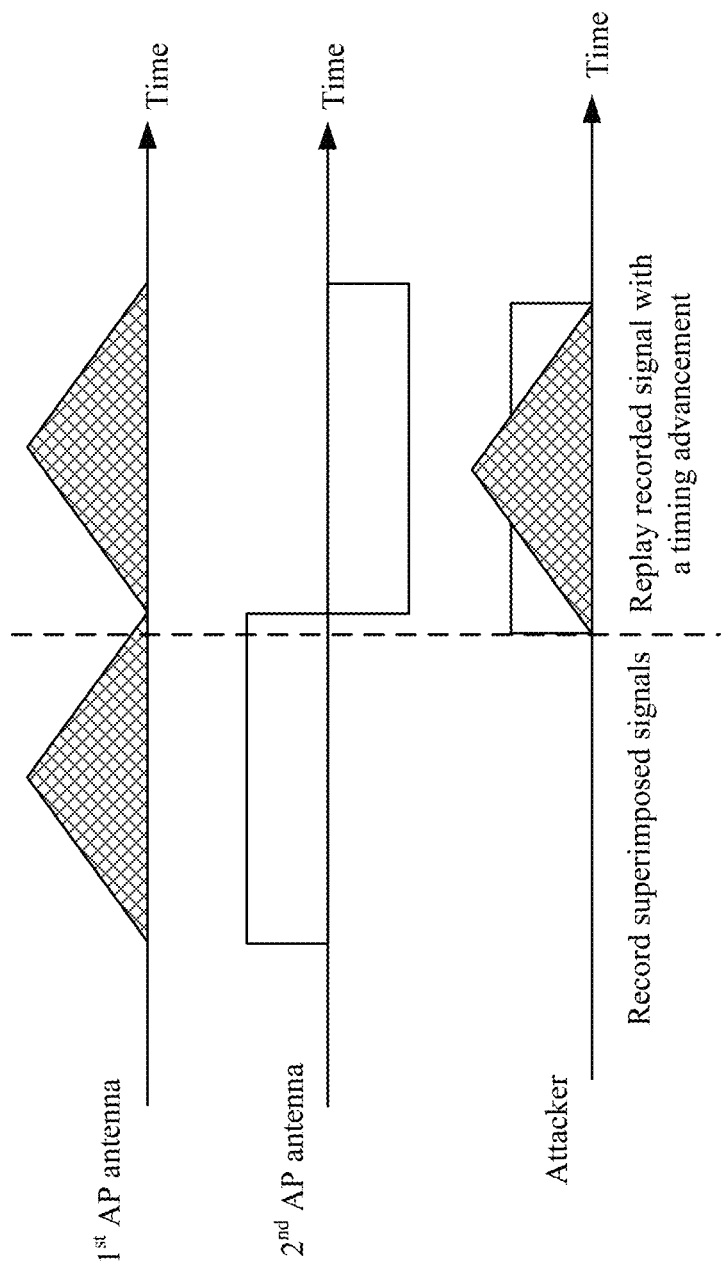
FIG. 6 illustrates a scenario of P-matrix code replay attack.

FIGS. 4-6 show three example attack modes. FIG. 4 illustrates a scenario of interfering attack. In this scenario, a desired transmitter 401, such as the AP as shown in FIGS. 2-3, may send a DL sounding signal to a desired receiver 402, such as the STA(s) as shown in FIGS. 2-3. An attacker 401' doesn't know what the DL sounding signal looks like and just sends an arbitrary signal such as a spike to interfere the DL sounding. The effect of the attack is that multiple fake multipaths (spikes with hollow triangle as indicated) present at the channel estimate of the desired receiver 402. From the perspective of the desired receiver 402, a fake multipath would be considered as the first channel arrival from the desired transmitter 401, which is earlier than that of the actual multipaths (spikes with solid triangle as indicated). This may make the detected ToA at the desired receiver 402 earlier than the actual one, and thus jeopardize the security of ranging applications (e.g. door unlocking and screen unlocking).

FIG. 5 illustrates a scenario of CP replay attack. In this scenario, an attacker 501' takes advantage of the partial repetitive structure of OFDM symbol, where the ending portion is the repetition of the beginning portion (CP). The attacker 501' records the beginning portion (CP) of the received sounding symbol, which is an OFDM symbol in legacy modes transmitted by a desired transmitter 501, and replays the recorded portion at the end of the sounding symbol with a timing advancement. As a result, the timing advancement creates a fake channel arrival earlier than the actual one. This may make the detected ToA at the desired receiver earlier than the actual one, and thus jeopardize the security of ranging applications (e.g. door unlocking and screen unlocking).

FIG. 6 illustrates a scenario of P-matrix code replay attack. In this scenario, an attacker also takes advantages of the repetition in the P-matrix coded transmission. The sounding symbol for each antenna is sent multiple times with different global phases P specified by the P-matrix code (e.g.

$$\begin{bmatrix} 1 & 1 \\ 1 & -1 \end{bmatrix}$$

in this scenario). Even though one can send different sounding symbols for different antennas, the attack can still be made as illustrated in FIG. 6.

For example, according to the global phase specified by the P-matrix code, AP antenna 1 transmits a first and second sounding symbol A and another A, and AP antenna 2 transmits a first and second sounding symbols B and −B. At the first place, an attacker did not know what the sounding signals look like. Then, the attacker records the first received sounding symbol R1, which is a superimposition of the first sounding symbols for above described two antennas (i.e. A+B), and then it can replay the overlapped signal and a timing advancement to deceive the desired receivers (not shown in FIG. 6). This may make the detected ToA at the desired receiver earlier than the actual one, and thus jeopardize the security of ranging applications (e.g. door unlocking and screen unlocking).

What is worse, the attacker keeps recording the second received sounding symbol R2 (i.e. A−B) and obtains two overlapped signals in sequence. By decoding these two received overlapped sounding symbols with linear equation in two unknowns, the attacker can easily derive what the two original sounding symbols exactly are, i.e. A=(R1+R2)/2, and B=(R1−R2)/2. In this example, the channel responses are the unity for the simplicity of illustration.

In a more ordinary case, there are more than two kinds of sounding symbols transmitted from two or more antennas. However, the attacker might still be able to decode the original sounding symbols (i.e. solve linear equation in multiple unknowns). Say there are four symbols x0, x1, x2, and x3 which are unknown to the attacker, and the P-matrix is $$\begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

After recording these four symbols overlapped with each other in four time slots, the attacker can obtain four superimpositions (say W, X, Y, and Z). Hence, four original sounding symbols would be decoded as x0=(W+X+Y−Z)/4, x1=(−W+X+Y+Z)/4, x2=(W−X+Y+Z)/4, and x3=(W+X−Y+Z)/4.

Note that, in the above example attack modes, the distance estimation uses the whole sounding signal instead of the first samples arrived. For example, the sounding signal is a sinusoid wave with one period. In a matched filter implementation, the receiver matches the locally generated sinusoid wave with the received sinusoid wave. If a matched waveform is detected, the signal arrival is declared. Therefore, the attacker can record the CP and replay it when the receiver still receives signal, even though the beginning part of the signal was already received.

Figure 7:
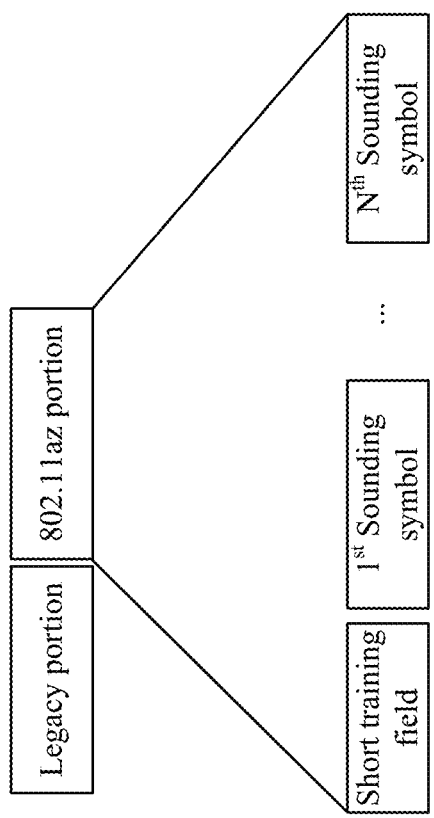
FIG. 7 illustrates an example NDP structure in accordance with some examples.

FIG. 7 illustrates an example NDP structure in accordance with some examples. To prevent the above three attacks (illustrated in FIGS. 4-6), the legacy sounding signal is modified, e.g. 802.11ax NDP, for 802.11az (or 802.11mc) secure mode. The sounding signal structure in this embodiment is illustrated in FIG. 7. The legacy portion can be the same as 802.11ax's "L-STF+L-LTF+L-SIG+RL-SIG+HE-SIG-A" or 802.11ac's NDP beginning portions before VHT-STF. The legacy portion is for backward compatibility. The 802.11az portion can start by a short training field (STF) for setting the receiver's automatic gain control (AGC). The 802.11az STF can reuse 802.11ax's HE-STF (high efficiency long training field) or 802.11ac's VHT-STF (very high throughput short training field). After the STF, there are multiple sounding symbols as illustrated in FIG. 7.

Figure 8:
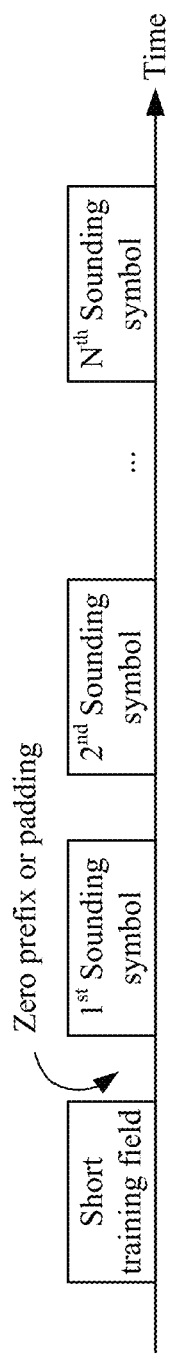
FIG. 8 illustrates another example NDP structure for combating the CP replay attack in accordance with some examples.

FIG. 8 illustrates another example NDP structure for combating the CP replay attack in accordance with some examples. For combating the CP replay attack, there is no CP in each sounding symbol as illustrated in FIG. 8. Namely, there is no sub-symbol level repetition in the sounding symbol. Furthermore, for each sounding symbol, zero prefix of padding is used to combat the inter-symbol interference.

Figure 9:
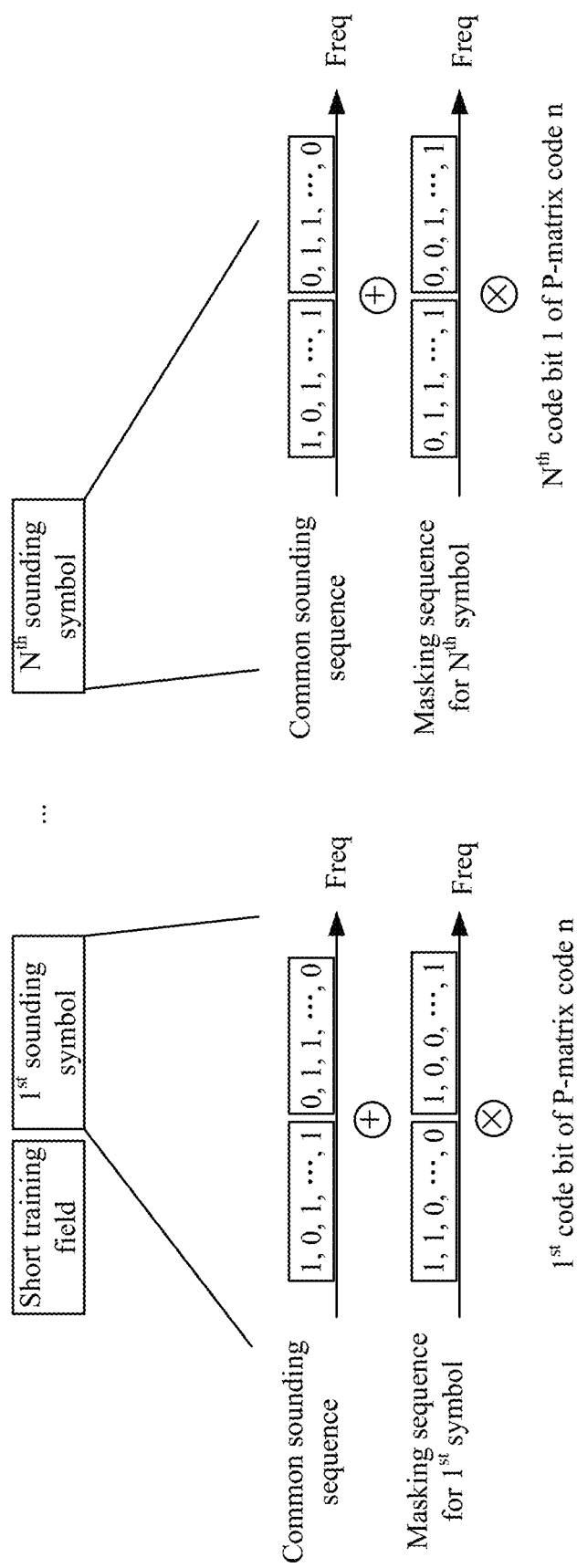
FIG. 9 illustrates yet another example NDP structure for combating the P-matrix code replay attack in accordance with some examples.

FIG. 9 illustrates yet another example NDP structure for combating the P-matrix code replay attack in accordance with some examples. For combating P-matrix code replay, any repetition at the symbol level is removed. Namely, the sounding symbols are all different. One example for generating the sounding symbols is illustrated in FIG. 9. In frequency domain, a common sounding sequence e.g. the legacy HE-LTF sequence may be XOR with a masking sequence bit by bit. When the common sounding sequence is the sequence with all one or zero bits, the masking step can be skipped and the generated sequence is just the same or opposite of the masking sequence. It should be noticed that the masking sequence has 39 bits in total, in which 30 bits are used for controlling the shape of each sounding symbol and remain 9 bits are used for random shifting. That is to say, with the masking sequence, billions of (i.e. $2^{30}$) different sounding symbols could be generated, which makes the attacker impossible to interpret one by one from so many combinations. After the bit-by-bit XOR masking, the bits are mapped to modulation constellations and the mapped constellation symbols are loaded to the subcarriers of the sounding symbol. After the loading, the frequency domain signal is converted to the time domain. Instead of CP, zero-prefix or padding is added. Finally, the global phase of the sounding symbol is applied according to the corresponding entry of the P-matrix code.

Figure 10:
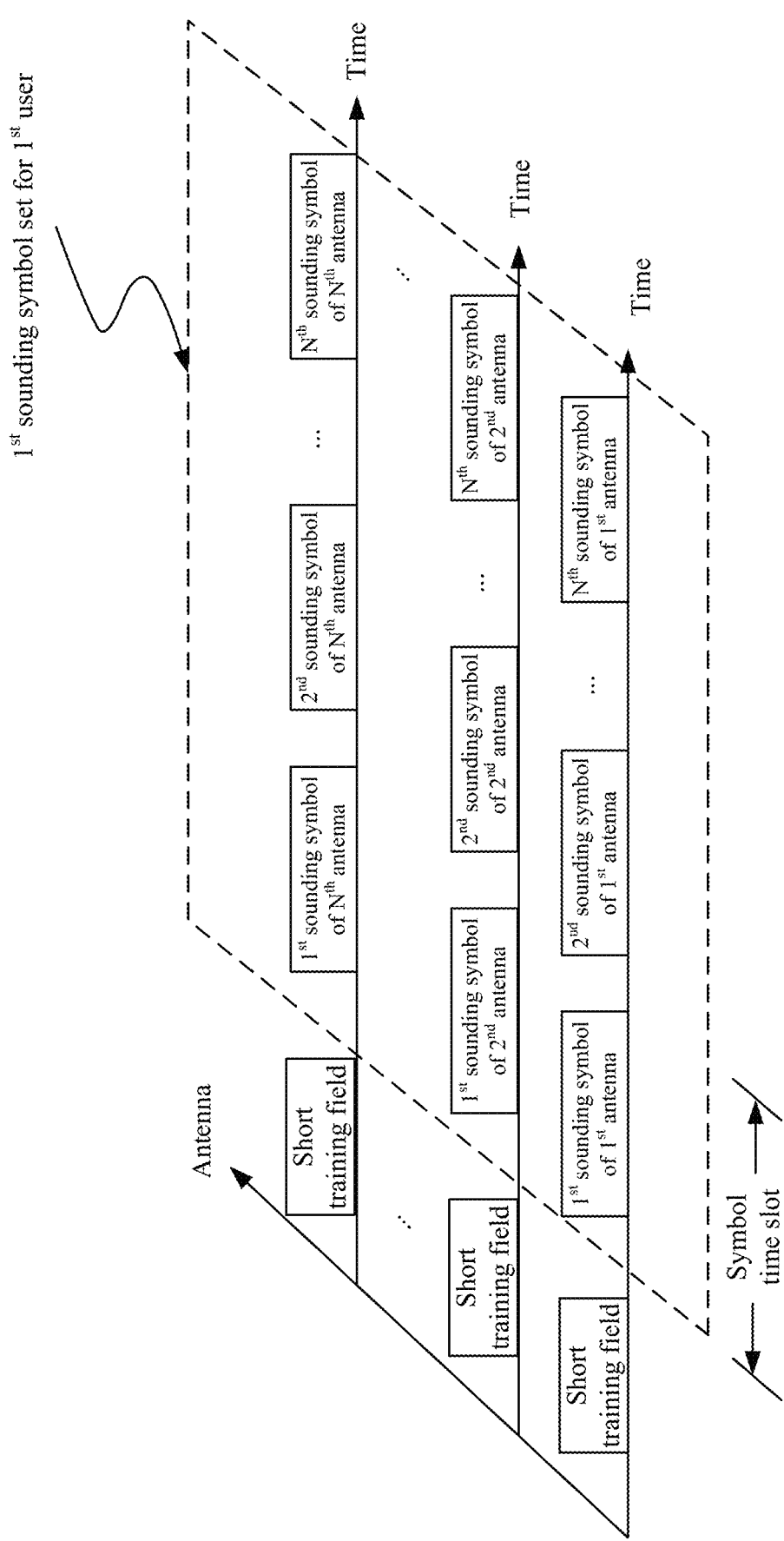
FIG. 10 illustrates an example structure of a multi-antenna sounding signal for a user in accordance with some examples.
Figure 11:
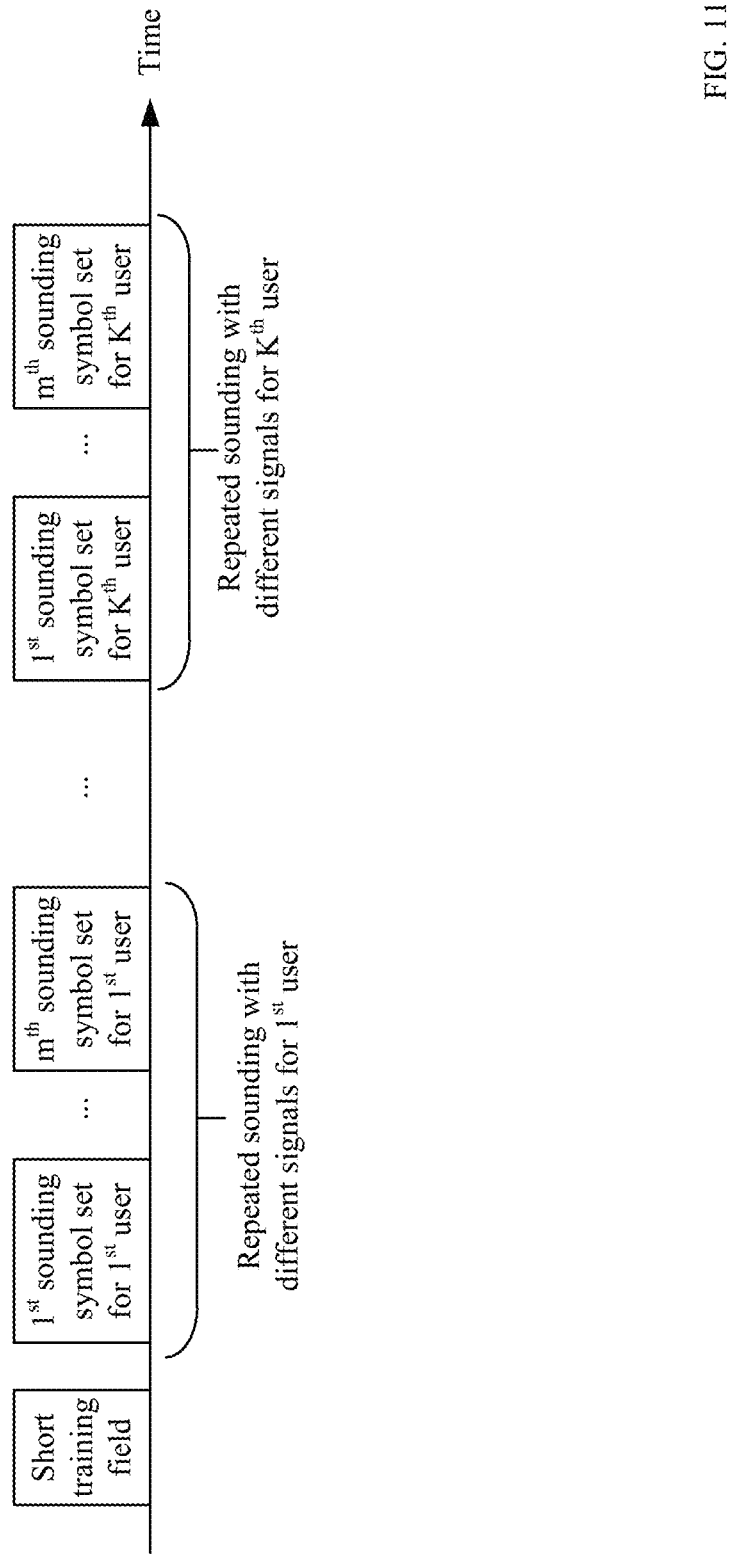
FIG. 11 illustrates an example structure of a sounding signal for multiple users in accordance with some examples.
Figure 12:
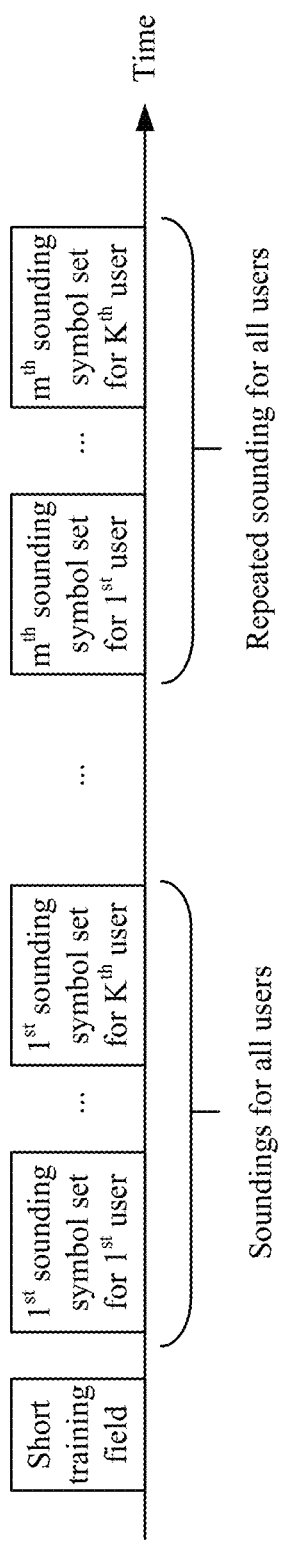
FIG. 12 illustrates another example structure of a sounding signal for multiple users in accordance with some examples.
Figure 13:
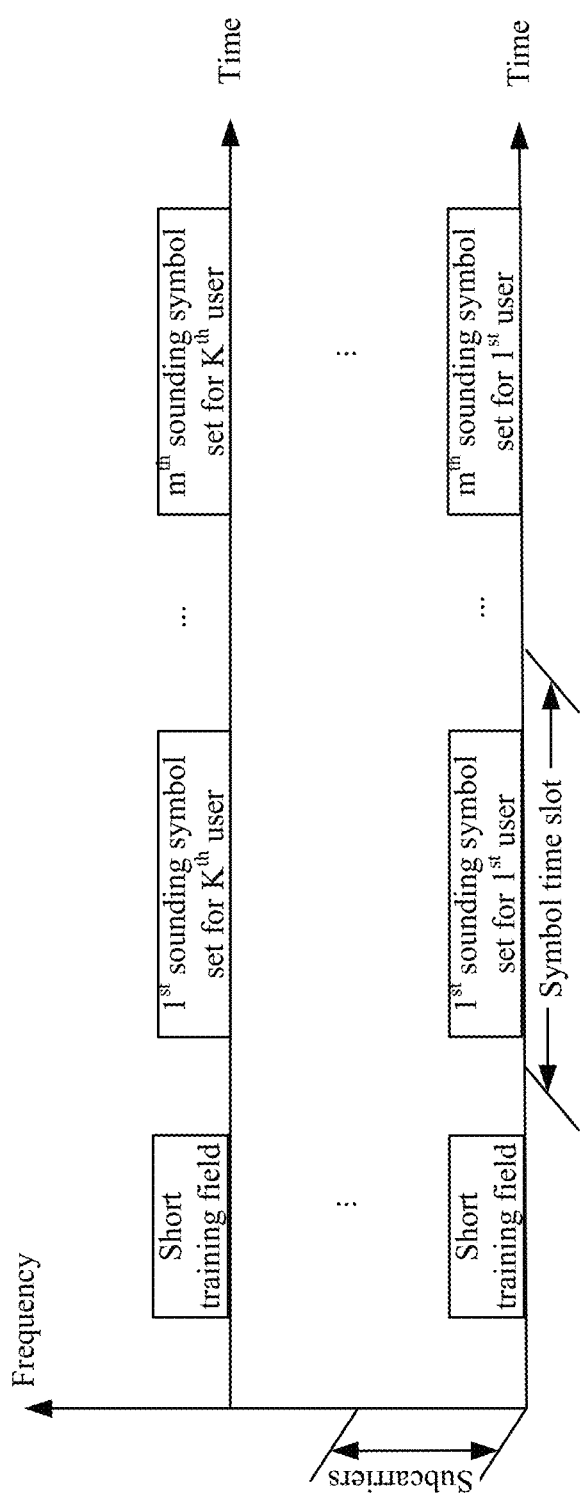
FIG. 13 illustrates yet another example structure of a sounding signal for multiple users in accordance with some examples.

FIG. 10 illustrates an example structure of a multi-antenna sounding signal for a user in accordance with some examples. FIG. 11 illustrates an example structure of a sounding signal for multiple users in accordance with some examples. FIG. 12 illustrates another example structure of a sounding signal for multiple users in accordance with some examples. FIG. 13 illustrates yet another example structure of a sounding signal for multiple users in accordance with some examples.

For combating the P-matrix replay attack, the sounding signals for different users may be separated in time domain (or frequency domain) not in P-matrix code domain, as illustrated in FIGS. 11-13. For the same user, the sounding symbols for different antennas can be multiplexed by P-matrix codes with different masking sequences across sounding symbols, as illustrated in FIG. 10.

For combating the interfering attack, each antenna may sound the channel multiple times within the channel coherence time, as illustrated in FIGS. 11-13. It should be noticed that the sounding signal should be different over time for preventing replay attacks. The receiver of the soundings checks the consistency of the channel estimates for identifying attacks. If there are no attacks, the channel estimates should remain the same. If there is an attack, the channel estimates are likely to be different because the attacker could not vary the interfering signal following the desired transmitter's varying signal for generating fake multipaths consistently over time. It should be noticed that the varying sounding signal is unknown to the attacker.

As shown in FIG. 10, each antenna sends a sounding symbol set, which includes a series of the sounding symbols. For each antenna, the sounding symbols are different, i.e., no repetition structure. For example, $1^{st}$ sounding symbol of $1^{st}$ antenna and $N^{th}$ sounding symbol of $1^{st}$ antenna are different. At each symbol time slot, the sounding symbols for all the antennas of the same user can be the same except that their global phases may be different. For example, $1^{st}$ sounding symbol of $1^{st}$ antenna for $1^{st}$ user and $1^{st}$ sounding symbol of $N^{th}$ antenna for $1^{st}$ user can be the same except a global phase difference. For example, the masking sequence in FIG. 9 can be the same for all symbols in the same symbol time slot for the same user.

In one scenario, the following P-matrix can be applied for sounding with 4 antennas:

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

For the first antenna, for example, symbol x0, −x1, x2, x3 can be sent; for the second antenna, for example, symbol x0, x1, −x2, x3 can be sent; for the third antenna, for example, symbol x0, x1, x2, −x3 can be sent; for the fourth antenna, for example, symbol −x0, x1, x2, x3 can be sent.

For example, the AP(s) as shown in FIGS. 2-3 send DL sounding via its 2 antennas for $1^{st}$ user (or $1^{st}$ STA) and $2^{nd}$ user (or $2^{nd}$ STA) by using 8 symbol time slots. Each sounding symbol set consists of 2 symbol time slots with sounding signals for the 2 AP antennas and for one user. Then, 4 sounding symbol sets can be formed and 2 for each user (or each STA). The DL sounding for each user may be sent sequentially as illustrated in FIG. 11. Namely, 2 sounding symbol sets for $1^{st}$ user are sent followed by the 2 sets for $2^{nd}$ user.

For providing more processing time for the latter users, e.g., $2^{nd}$ user (or $2^{nd}$ STA), the sounding symbol set or even sounding symbol may be interleaved as shown in FIG. 12. All users receive their sounding symbol sets before any repeated sounding symbol sets. Namely, the transmitter of AP finishes one round of soundings for all users first and then repeats the soundings for another round.

Furthermore, as shown in FIG. 13, the sounding signal for multiple users may be arranged at frequency domain (subcarriers of OFDM), rather than time domain. For example, the whole bandwidth of the AP(s) as shown in FIGS. 2-3 is divided for each user (STA). For example, the whole bandwidth of the AP is 80 MHz, and there are 4 STAs, then each STA may take 20 MHz. That is, the DL sounding for each user occupies one fourth of whole number of the subcarriers.

Note that, the above examples also can be applicable to the cellular network. That is, the AP(s) as shown in FIGS. 2-3 may implemented as evolved NodeB (eNB) or other types of base station according to 3G, 4G, 5G or beyond.

For example, for positioning mode, three eNBs can be used to determine the relative position of the STA(s) such as the example STA(s) 102 to the eNBs by using the above sounding procedure. That is, the STA(s) can be positioned by three base stations. Then, according to the relative position of the STA(s), the distance between the STA(s) and the example locked device 101 can be calculated.

Note that, there can be more or less eNBs to determine the relative position of the STA(s). For example, the eNB can determine the distance and the arrival angle of the STA(s) by using the above sounding procedure. Then, the distance between the STA(s) and the example locked device 101 can be calculated. Besides, other positioning technologies by using sounding are also applicable.

Figure 14:
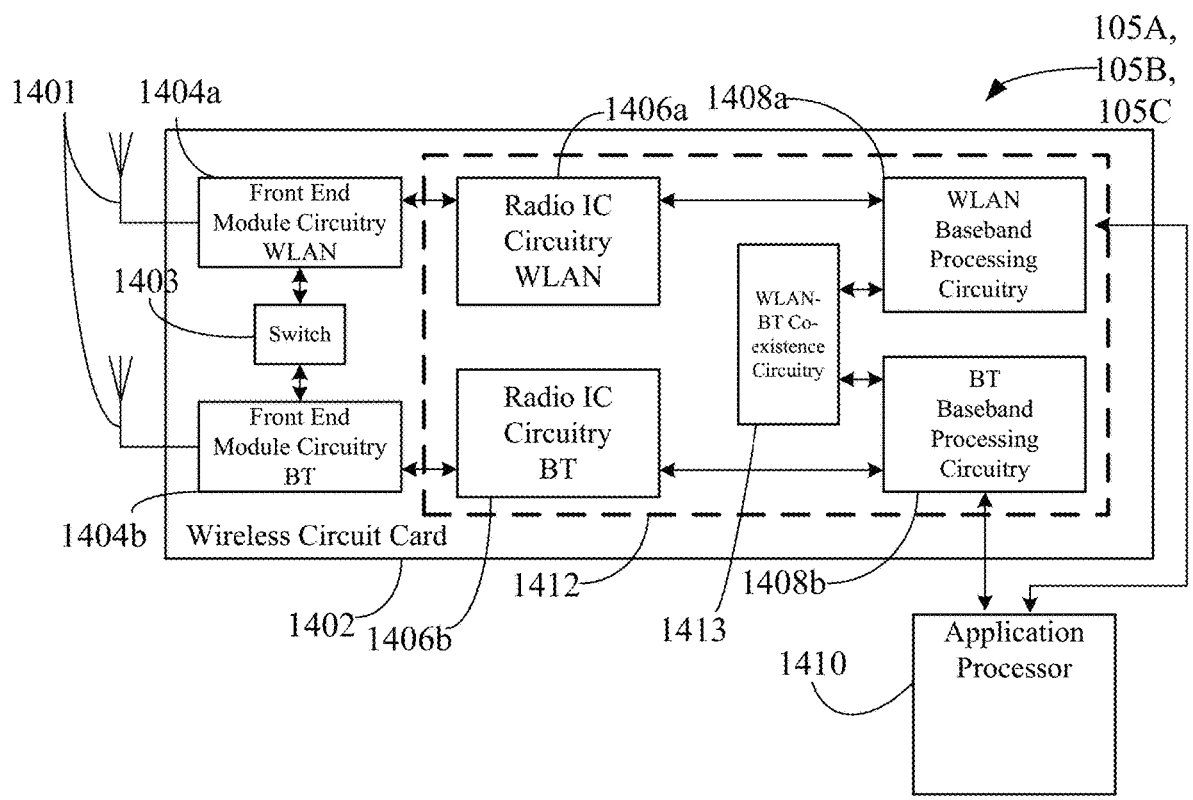
FIG. 14 is a block diagram of radio architecture in accordance with some examples.

FIG. 14 is a block diagram of radio architecture 105A, 105B, 105C in accordance with some examples. The radio architecture 105A, 105B, 105C may be implemented in any one of the example AP 100, the example STAs 102, and the example locked device 101 of FIG. 1. Radio architecture 105A, 105B, 105C may include radio front-end module (FEM) circuitry 1404a-b, radio IC circuitry 1406a-b and baseband processing circuitry 1408a-b. Radio architecture 105A, 105B, 105C as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1404a-b may include a WLAN or Wi-Fi FEM circuitry 1404a and a Bluetooth (BT) FEM circuitry 1404b. The WLAN FEM circuitry 1404a may include a receive signal path comprising circuitry configured to operate on WLAN RF signals received from one or more antennas 1401, to amplify the received signals and to provide the amplified versions of the received signals to the WLAN radio IC circuitry 1406a for further processing. The BT FEM circuitry 1404b may include a receive signal path which may include circuitry configured to operate on BT RF signals received from one or more antennas 1401, to amplify the received signals and to provide the amplified versions of the received signals to the BT radio IC circuitry 1406b for further processing. FEM circuitry 1404a may also include a transmit signal path which may include circuitry configured to amplify WLAN signals provided by the radio IC circuitry 1406a for wireless transmission by one or more of the antennas 1401. In addition, FEM circuitry 1404b may also include a transmit signal path which may include circuitry configured to amplify BT signals provided by the radio IC circuitry 1406b for wireless transmission by the one or more antennas. In the embodiment of FIG. 14, although FEM 1404a and FEM 1404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1406a-b as shown may include WLAN radio IC circuitry 1406a and BT radio IC circuitry 1406b. The WLAN radio IC circuitry 1406a may include a receive signal path which may include circuitry to down-convert WLAN RF signals received from the FEM circuitry 1404a and provide baseband signals to WLAN baseband processing circuitry 1408a. BT radio IC circuitry 1406b may in turn include a receive signal path which may include circuitry to down-convert BT RF signals received from the FEM circuitry 1404b and provide baseband signals to BT baseband processing circuitry 1408b. WLAN radio IC circuitry 1406a may also include a transmit signal path which may include circuitry to up-convert WLAN baseband signals provided by the WLAN baseband processing circuitry 1408a and provide WLAN RF output signals to the FEM circuitry 1404a for subsequent wireless transmission by the one or more antennas 1401. BT radio IC circuitry 1406b may also include a transmit signal path which may include circuitry to up-convert BT baseband signals provided by the BT baseband processing circuitry 1408b and provide BT RF output signals to the FEM circuitry 1404b for subsequent wireless transmission by the one or more antennas 1401. In the embodiment of FIG. 14, although radio IC circuitries 1406a and 1406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1408a-b may include a WLAN baseband processing circuitry 1408a and a BT baseband processing circuitry 1408b. The WLAN baseband processing circuitry 1408a may include a memory, such as, for example, a set of RAM arrays in a Fast Fourier Transform or Inverse Fast Fourier Transform block (not shown) of the WLAN baseband processing circuitry 1408a. Each of the WLAN baseband circuitry 1408a and the BT baseband circuitry 1408b may further include one or more processors and control logic to process the signals received from the corresponding WLAN or BT receive signal path of the radio IC circuitry 1406a-b, and to also generate corresponding WLAN or BT baseband signals for the transmit signal path of the radio IC circuitry 1406a-b. Each of the baseband processing circuitries 1408a and 1408b may further include physical layer (PHY) and medium access control layer (MAC) circuitry, and may further interface with the link aggregator for generation and processing of the baseband signals and for controlling operations of the radio IC circuitry 1406a-b.

Referring still to FIG. 14, according to the shown embodiment, WLAN-BT coexistence circuitry 1413 may include logic providing an interface between the WLAN baseband circuitry 1408a and the BT baseband circuitry 1408b to enable use cases requiring WLAN and BT coexistence. In addition, a switch 1403 may be provided between the WLAN FEM circuitry 1404a and the BT FEM circuitry 1404b to allow switching between the WLAN and BT radios according to application needs. In addition, although the antennas 1401 are depicted as being respectively connected to the WLAN FEM circuitry 1404a and the BT FEM circuitry 1404b, embodiments include within their scope the sharing of one or more antennas as between the WLAN and BT FEMs, or the provision of more than one antenna connected to each of FEM 1404a or 1404b.

In some embodiments, the front-end module circuitry 1404a-b, the radio IC circuitry 1406a-b, and baseband processing circuitry 1408a-b may be provided on a single radio card, such as wireless radio card 1402. In some other embodiments, the one or more antennas 1401, the FEM circuitry 1404a-b and the radio IC circuitry 1406a-b may be provided on a single radio card. In some other embodiments, the radio IC circuitry 1406a-b and the baseband processing circuitry 1408a-b may be provided on a single chip or integrated circuit (IC), such as IC 1412.

In some embodiments, the wireless radio card 1402 may include a WLAN radio card and may be configured for Wi-Fi communications, although the scope of the embodiments is not limited in this respect. In some of these embodiments, the radio architecture 105A, 105B, 105C may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B, 105C may be part of a Wi-Fi communication station (STA) such as a wireless access point (AP), a base station or a mobile device including a Wi-Fi device. In some of these embodiments, radio architecture 105A, 105B, 105C may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B, 105C may also be suitable to transmit and/or receive communications in accordance with other techniques and standards.

In some embodiments, the radio architecture 105A, 105B, 105C may be configured for high-efficiency Wi-Fi (HEW) communications in accordance with the IEEE 802.11ax standard. In these embodiments, the radio architecture 105A, 105B, 105C may be configured to communicate in accordance with an OFDMA technique, although the scope of the embodiments is not limited in this respect.

In some other embodiments, the radio architecture 105A, 105B, 105C may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 1408b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B, 105C may include other radio cards, such as a cellular radio card configured for cellular (e.g., 3GPP such as LTE, LTE-Advanced or 5G communications).

In some IEEE 802.11 embodiments, the radio architecture 105A, 105B, 105C may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 15:
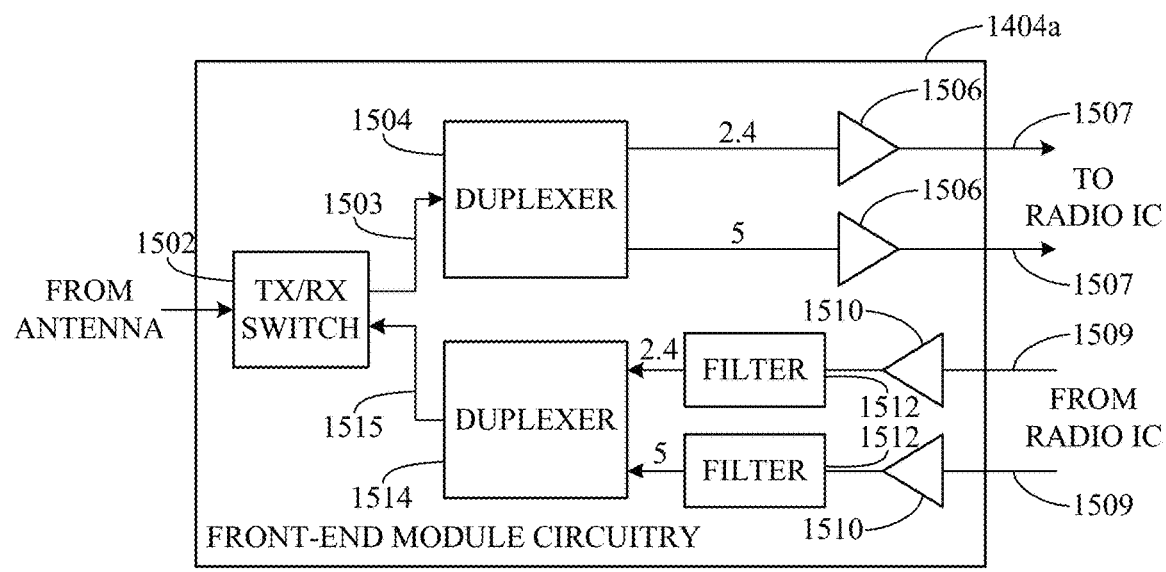
FIG. 15 illustrates an example front-end module circuitry for use in the radio architecture of FIG. 14 in accordance with some examples.

FIG. 15 illustrates an example front-end module circuitry 1404a for use in the radio architecture of FIG. 14 in accordance with some examples. Although the example of FIG. 15 is described in conjunction with the WLAN FEM circuitry 1404a, the example of FIG. 15 may be described in conjunction with the example BT FEM circuitry 1404b (FIG. 14), although other circuitry configurations may also be suitable.

In some embodiments, the FEM circuitry 1404a may include a TX/RX switch 1502 to switch between transmit mode and receive mode operation. The FEM circuitry 1404a may include a receive signal path and a transmit signal path. The receive signal path of the FEM circuitry 1404a may include a low-noise amplifier (LNA) 1506 to amplify received RF signals 1503 and provide the amplified received RF signals 1507 as an output (e.g., to the radio IC circuitry 1406a-b (FIG. 14)). The transmit signal path of the circuitry 1404a may include a power amplifier (PA) to amplify input RF signals 1509 (e.g., provided by the radio IC circuitry 1406a-b), and one or more filters 1512, such as band-pass filters (BPFs), low-pass filters (LPFs) or other types of filters, to generate RF signals 1515 for subsequent transmission (e.g., by one or more of the antennas 1401 (FIG. 14)) via an example duplexer 1514.

In some dual-mode embodiments for Wi-Fi communication, the FEM circuitry 1404a may be configured to operate in either the 2.4 GHz frequency spectrum or the 5 GHz frequency spectrum. In these embodiments, the receive signal path of the FEM circuitry 1404a may include a receive signal path duplexer 1504 to separate the signals from each spectrum as well as provide a separate LNA 1506 for each spectrum as shown. In these embodiments, the transmit signal path of the FEM circuitry 1404a may also include a power amplifier 1510 and a filter 1512, such as a BPF, an LPF or another type of filter for each frequency spectrum and a transmit signal path duplexer 1504 to provide the signals of one of the different spectrums onto a single transmit path for subsequent transmission by the one or more of the antennas 1401 (FIG. 14). In some embodiments, BT communications may utilize the 2.4 GHz signal paths and may utilize the same FEM circuitry 1404a as the one used for WLAN communications.

Figure 16:
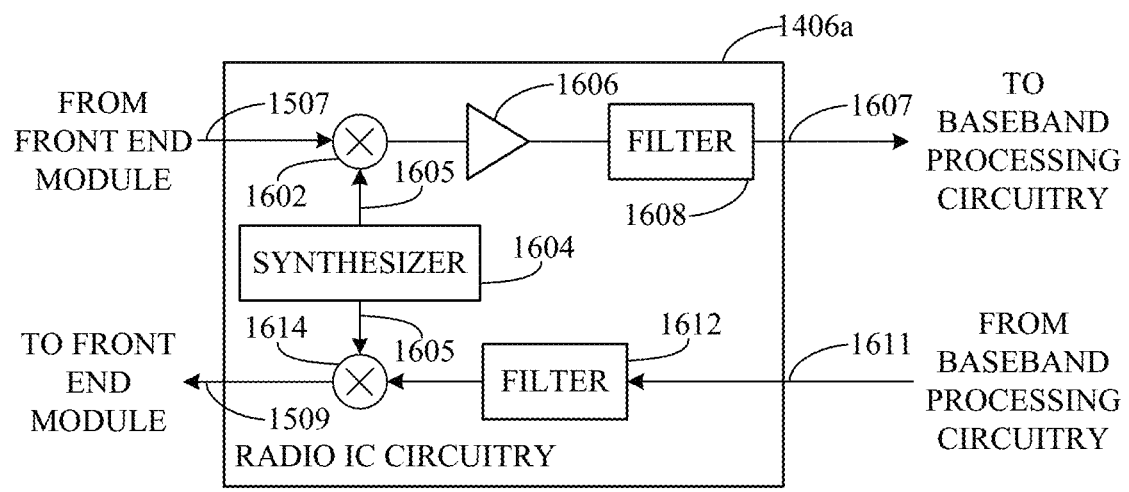
FIG. 16 illustrates an example radio IC circuitry for use in the radio architecture of FIG. 14 in accordance with some examples.

FIG. 16 illustrates an example radio IC circuitry 1406a for use in the radio architecture of FIG. 14 in accordance with some examples. The radio IC circuitry 1406a is one example of circuitry that may be suitable for use as the WLAN or BT radio IC circuitry 1406a/1406b (FIG. 14), although other circuitry configurations may also be suitable. Alternatively, the example of FIG. 16 may be described in conjunction with the example BT radio IC circuitry 1406*b*.

In some embodiments, the radio IC circuitry 1406*a* may include a receive signal path and a transmit signal path. The receive signal path of the radio IC circuitry 1406*a* may include at least mixer circuitry 1602, such as, for example, down-conversion mixer circuitry, amplifier circuitry 1606 and filter circuitry 1608. The transmit signal path of the radio IC circuitry 1406*a* may include at least filter circuitry 1612 and mixer circuitry 1614, such as, for example, up-conversion mixer circuitry. Radio IC circuitry 1406*a* may also include synthesizer circuitry 1604 for synthesizing a frequency 1605 for use by the mixer circuitry 1602 and the mixer circuitry 1614. The mixer circuitry 1602 and/or 1614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 16 illustrates only a simplified version of a radio IC circuitry, and may include, although not shown, embodiments where each of the depicted circuitries may include more than one component. For instance, mixer circuitry 1614 may each include one or more mixers, and filter circuitries 1608 and/or 1612 may each include one or more filters, such as one or more BPFs and/or LPFs according to application needs. For example, when mixer circuitries are of the direct-conversion type, they may each include two or more mixers.

In some embodiments, mixer circuitry 1602 may be configured to down-convert RF signals 1507 received from the FEM circuitry 1404*a-b* (FIG. 14) based on the synthesized frequency 1605 provided by synthesizer circuitry 1604. The amplifier circuitry 1606 may be configured to amplify the down-converted signals and the filter circuitry 1608 may include an LPF configured to remove unwanted signals from the down-converted signals to generate output baseband signals 1607. Output baseband signals 1607 may be provided to the baseband processing circuitry 1408*a-b* (FIG. 14) for further processing. In some embodiments, the output baseband signals 1607 may be zero-frequency baseband signals, although this is not a requirement. In some embodiments, mixer circuitry 1602 may comprise passive mixers, although the scope of the embodiments is not limited in this respect.

In some embodiments, the mixer circuitry 1614 may be configured to up-convert input baseband signals 1611 based on the synthesized frequency 1605 provided by the synthesizer circuitry 1604 to generate RF output signals 1509 for the FEM circuitry 1404*a-b*. The baseband signals 1611 may be provided by the baseband processing circuitry 1408*a-b* and may be filtered by filter circuitry 1612. The filter circuitry 1612 may include an LPF or a BPF, although the scope of the embodiments is not limited in this respect.

In some embodiments, the mixer circuitry 1602 and the mixer circuitry 1614 may each include two or more mixers and may be arranged for quadrature down-conversion and/or up-conversion respectively with the help of synthesizer 1604. In some embodiments, the mixer circuitry 1602 and the mixer circuitry 1614 may each include two or more mixers each configured for image rejection (e.g., Hartley image rejection). In some embodiments, the mixer circuitry 1602 and the mixer circuitry 1614 may be arranged for direct down-conversion and/or direct up-conversion, respectively. In some embodiments, the mixer circuitry 1602 and the mixer circuitry 1614 may be configured for super-heterodyne operation, although this is not a requirement.

Mixer circuitry 1602 may comprise, according to one embodiment: quadrature passive mixers (e.g., for the in-phase (I) and quadrature phase (Q) paths). In such an embodiment, RF input signal 1507 from FIG. 16 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1605 of synthesizer 1604 (FIG. 16). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1507 (FIG. 15) may comprise a balanced signal, although the scope of the embodiments is not limited in this respect. The I and Q baseband output signals may be provided to low-noise amplifier, such as amplifier circuitry 1606 (FIG. 16) or to filter circuitry 1608 (FIG. 16).

In some embodiments, the output baseband signals 1607 and the input baseband signals 1611 may be analog baseband signals, although the scope of the embodiments is not limited in this respect. In some alternate embodiments, the output baseband signals 1607 and the input baseband signals 1611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1604 may be a fractional-N synthesizer or a fractional N/N+1 synthesizer, although the scope of the embodiments is not limited in this respect as other types of frequency synthesizers may be suitable. For example, synthesizer circuitry 1604 may be a delta-sigma synthesizer, a frequency multiplier, or a synthesizer comprising a phase-locked loop with a frequency divider. According to some embodiments, the synthesizer circuitry 1604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1604 may be provided by a voltage controlled oscillator (VCO), although that is not a requirement. A divider control input may further be provided by either the baseband processing circuitry 1408*a-b* (FIG. 14) depending on the desired output frequency 1605. In some embodiments, a divider control input (e.g., N) may be determined from a look-up table (e.g., within a Wi-Fi card) based on a channel number and a channel center frequency as determined or indicated by the example application processor 1410.

In some embodiments, synthesizer circuitry 1604 may be configured to generate a carrier frequency as the output frequency 1605, while in other embodiments, the output frequency 1605 may be a fraction of the carrier frequency (e.g., one-half the carrier frequency, one-third the carrier frequency). In some embodiments, the output frequency 1605 may be a LO frequency (fLO).

Figure 17:
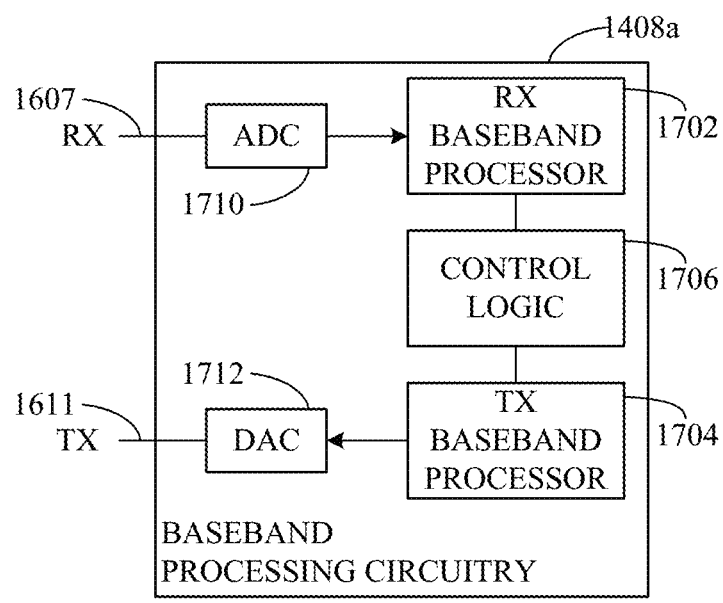
FIG. 17 illustrates an example baseband processing circuitry for use in the radio architecture of FIG. 14 in accordance with some examples.

FIG. 17 illustrates an example baseband processing circuitry 1408a for use in the radio architecture of FIG. 14 in accordance with some examples. The baseband processing circuitry 1408a is one example of circuitry that may be suitable for use as the baseband processing circuitry 1408a (FIG. 14), although other circuitry configurations may also be suitable. Alternatively, the example of FIG. 17 may be used to implement the example BT baseband processing circuitry 1408b of FIG. 14.

The baseband processing circuitry 1408a may include a receive baseband processor (RX BBP) 1702 for processing receive baseband signals 1607 provided by the radio IC circuitry 1406a-b (FIG. 14) and a transmit baseband processor (TX BBP) 1704 for generating transmit baseband signals 1611 for the radio IC circuitry 1406a-b. The baseband processing circuitry 1408a may also include control logic 1706 for coordinating the operations of the baseband processing circuitry 1408a.

In some embodiments (e.g., when analog baseband signals are exchanged between the baseband processing circuitry 1408a-b and the radio IC circuitry 1406a-b), the baseband processing circuitry 1408a may include ADC 1710 to convert analog baseband signals 1607 received from the radio IC circuitry 1406a-b to digital baseband signals for processing by the RX BBP 1702. In these embodiments, the baseband processing circuitry 1408a may also include DAC 1712 to convert digital baseband signals from the TX BBP 1704 to analog baseband signals 1611.

In some embodiments that communicate OFDM signals or OFDMA signals, such as through baseband processor 1408a, the transmit baseband processor 1704 may be configured to generate OFDM or OFDMA signals as appropriate for transmission by performing an inverse fast Fourier transform (IFFT). The receive baseband processor 1702 may be configured to process received OFDM signals or OFDMA signals by performing an FFT. In some embodiments, the receive baseband processor 1702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 14, in some embodiments, the antennas 1401 (FIG. 14) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1401 may each include a set of phased-array antennas, although embodiments are not so limited.

Although the radio architecture 105A, 105B, 105C is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 18:
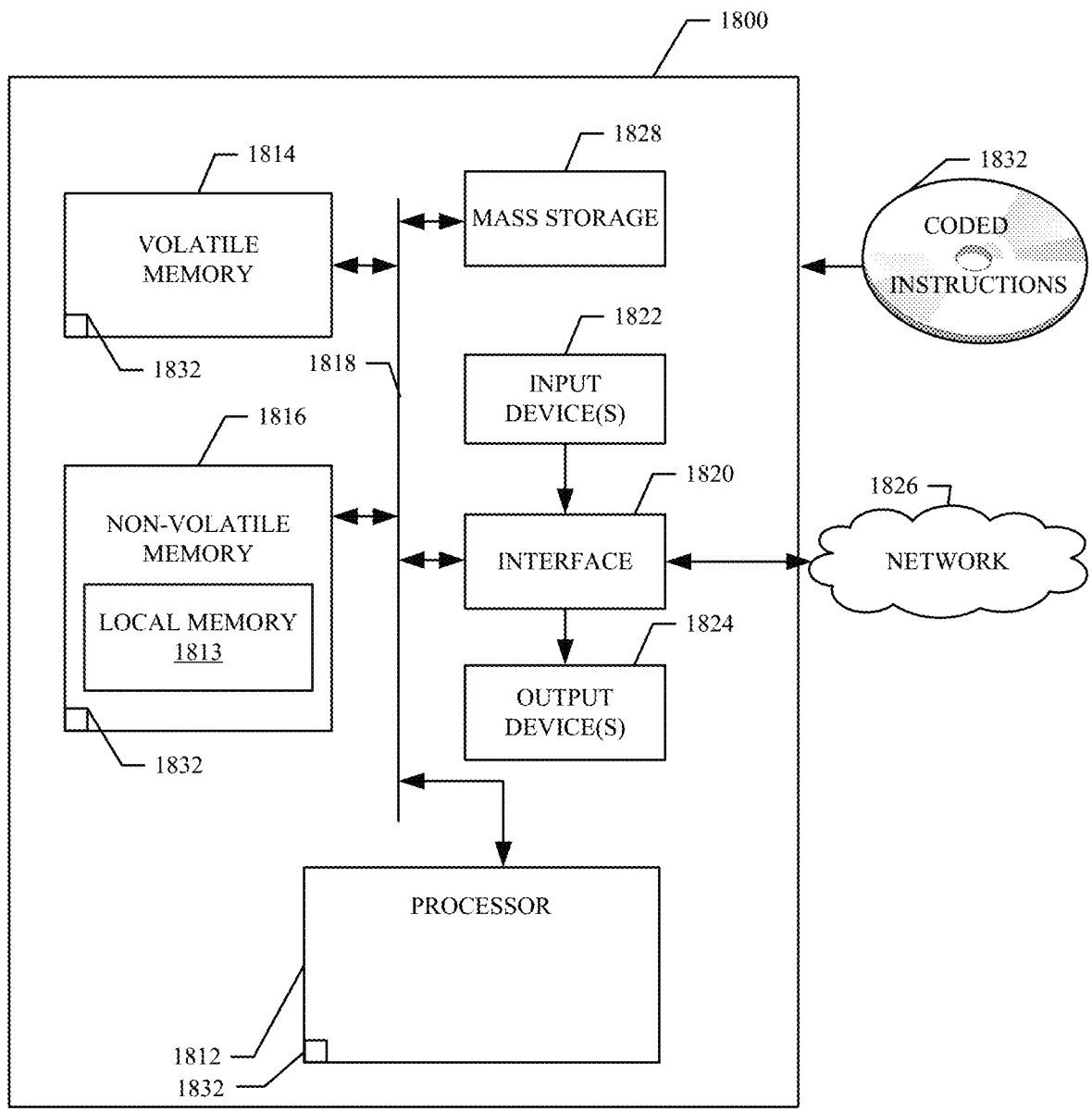
FIG. 18 is a block diagram of an example processor platform capable of transmitting the sounding signals shown in FIGS. 11-13, to implement the example sounding procedure(s) of FIGS. 2 and/or 3 in accordance with some examples.

FIG. 18 is a block diagram of an example processor platform 1800 capable of transmitting the sounding signals shown in FIGS. 11-13, to implement the example sounding procedure(s) of FIGS. 2 and/or 3 in accordance with some examples. The processor platform 1800 can be, for example, a server, a personal computer, a mobile device (e.g., a cell phone, a smart phone, a tablet such as an iPad™), a personal digital assistant (PDA), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a clock controller.

In some embodiments, the processor 1812 is configured to: encode a sounding signal, wherein the sounding signal comprises a plurality of sounding symbols, and wherein the repetition of sounding symbols to be transmitted in sequence is avoided, as shown in FIGS. 8-13. In some embodiments, the processor 1812 is configured to perform any actions of the desired transmitter or desired receiver as shown in FIGS. 1-13, such as the STAs and AP as shown in FIGS. 2-3.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and commands into the processor 1812. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives.

The coded instructions 1832 may be stored in the mass storage device 1828, in the volatile memory 1814, in the non-volatile memory 1816, and/or on a removable tangible computer readable storage medium such as a CD or DVD.

Figure 19:
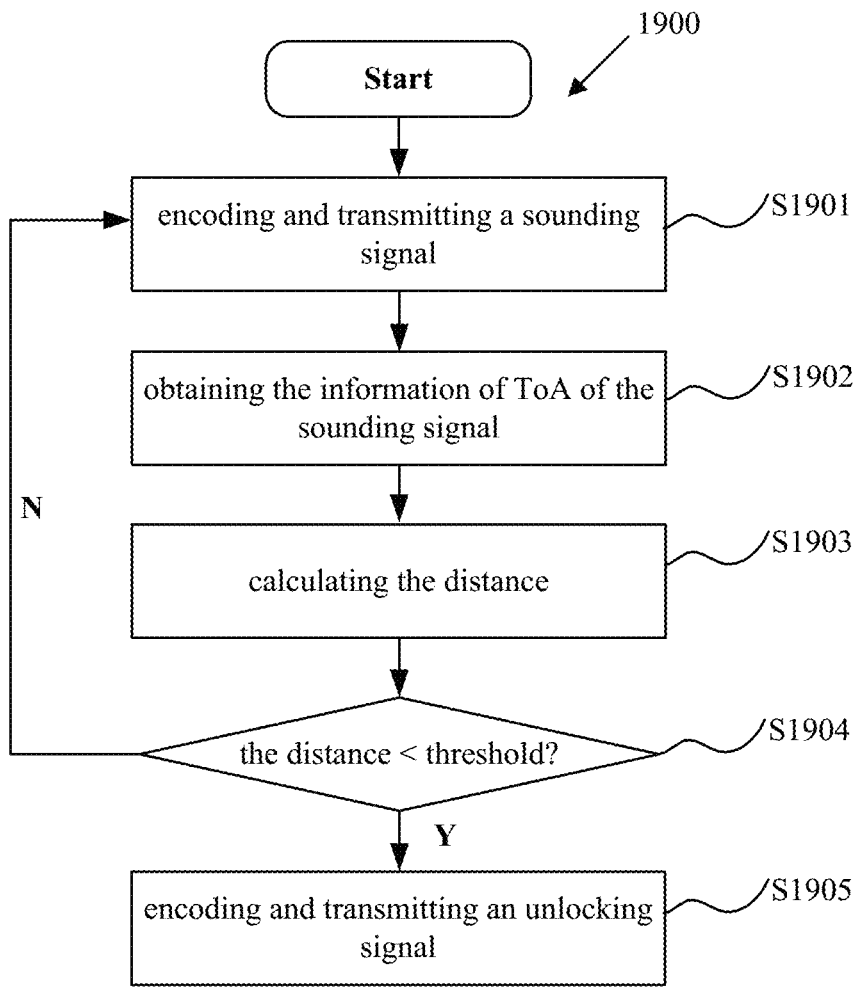
FIG. 19 illustrates an example flowchart of a method for sounding in accordance with some examples.

FIG. 19 illustrates an example flowchart of a method 1900 for sounding, in accordance with some examples. In one embodiment, the flow chart in FIG. 19 can be implemented in the processor platform 1800 in FIG. 18.

The method 1900 may begin with step S1901, in which the processor platform 1800, e.g., the processor 1812 may encode a sounding signal, and then the processor platform 1800, e.g., the interface circuit 1820 may transmit the encoded sounding signal. The encoded sounding signal may comprise a plurality of sounding symbols, in which the repetition of sounding symbols to be transmitted in sequence is avoided.

Furthermore, as shown in FIG. 8, the intra symbol repetition is avoided by applying zero-prefix for each sounding symbol, and as shown in FIG. 9, the inter symbol repetition is avoided by applying masking sequence different from each other for each sounding symbol.

Furthermore, as shown in FIG. 10, the processor platform 1800 may comprise two or more antennas. For each antenna, the encoded sounding symbols in different time slots are different. For each time slot, the encoded sounding symbols on the two or more antennas are repeated, with different global phases determined by a general phase matrix, such as P-matrix. These sounding symbols consists a sounding symbol set for a single user.

Furthermore, as shown in FIGS. 2 and 3, the sounding signal may be transmitted after transmitting NDPA, which is used to indicate the structure of the sounding signal to be transmitted.

The processor platform 1800 may be configured as any one of Wi-Fi AP, station, or cellular base station, such as the example AP 100, the example STA(s) 102, the example locked device 103, or an example eNodeB. The encoded sounding signal may be configured as UL sounding or DL sounding.

In particular, for DL sounding, the processor platform 1800 may transmit the DL sounding signal for multiple users. The DL sounding symbols for different users are transmitted over different time slots and/or over different frequencies, as shown in FIGS. 11-13.

In an example case in which sounding symbols for different users are transmitted over different frequencies, the sounding symbols for each user can be transmitted on respective subcarriers. The sounding symbols for multiple users can be transmitted on the same time slots, as shown in FIG. 13.

In an example case in which sounding symbols for different users are transmitted over different time slots, all sounding symbols for a first user may be followed by any sounding symbol for a second user, as shown in FIG. 11.

In another example case in which sounding symbols for different users are transmitted over different time slots, the sounding symbols for different users may be transmitted in an interleaved approach. That is, the processor platform 1800 may transmit a first number of sounding symbol for a first user; then transmit a second number of sounding symbol for a second user; then transmit a third number of sounding symbol for the first user; and then transmit a fourth number of sounding symbol for the second user, as shown in FIG. 12.

Furthermore, for DL sounding, the processor platform 1800 may be configured to encode the sounding signal in response to an uplink sounding signal received from the STA(s), as shown in FIG. 3.

Then, the method 1900 may proceed to step S1902, after transmitting and receiving the UL and DL sounding, the processor platform 1800 may collect the ToA and ToD of the UL and DL sounding signal.

Then, the method 1900 may proceed to step S1903, the processor platform 1800 may calculate the distance between the two devices such AP and STA(s) as shown in FIGS. 2-3, based on the collected the ToA and ToD of the UL and DL sounding signal, by using the calculation described in combination to FIGS. 2 and 3.

Then, the method 1900 may proceed to step S1904, the calculated distance is compared with a predetermined threshold. In one scenario, the predetermined threshold may be 5 m for unlocking a door. If the calculated distance is greater than the predetermined threshold, the processor platform 1800 may perform the next sounding, since the distance is not near enough. Otherwise, the processor platform 1800 may encode an unlocking signal, to unlock a locked device, such as the example locked device 101.

The above steps are only examples, and the processor platform 1800 can perform any actions described in connection to FIGS. 1-13, to perform a secure sounding procedure.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus, comprising: a memory; and a processing circuitry coupled to the memory, the processing circuitry is configured to: encode a sounding signal, wherein the sounding signal comprises a plurality of sounding symbols, the repetition of sounding symbols to be transmitted in sequence is avoided.

Example 2 comprises the subject matter of any variation of example 1, wherein intra symbol repetition is avoided by applying zero-prefix for each sounding symbol, and wherein inter symbol repetition is avoided by applying masking sequence different from each other for each sounding symbol.

Example 3 comprises the subject matter of any variation of example 1 or example 2, wherein the apparatus comprises two or more antennas, each of the antennas is to transmit encoded sounding symbols based on the plurality of sounding symbols, wherein for each antenna, the encoded sounding symbols in different time slots are different, wherein for each time slot, the encoded sounding symbols on the two or more antennas are repeated, with different global phases determined by a general phase matrix.

Example 4 comprises the subject matter of any variation of any of examples 1-3, wherein the sounding signal is encoded for two or more users and to be transmitted to the two or more users, wherein the sounding symbols for different users are transmitted over different time slots and/or over different frequencies.

Example 5 comprises the subject matter of any variation of example 4, wherein all sounding symbols for a first user are followed by any sounding symbol for a second user.

Example 6 comprises the subject matter of any variation of example 4, wherein the sounding symbols for different users are to be transmitted in an interleaved approach, wherein transmitting of the sounding symbols for different users comprising: transmitting a first number of sounding symbols for a first user; transmitting a second number of sounding symbols for a second user; transmitting a third number of sounding symbols for the first user; and transmitting a fourth number of sounding symbols for the second user.

Example 7 comprises the subject matter of any variation of any of examples 1-6, wherein the processing circuitry is further configured to: record the Time of Departure (ToD) information of the sounding signal; obtain the Time of Arrival (ToA) information of the sounding signal from a receiving device; calculate the distance between the apparatus and the receiving device based on at least the ToD information and the ToA information; and encode an unlocking signal if the calculated distance is less than a predetermined threshold, to unlock a locked device.

Example 8 comprises the subject matter of any variation of any of examples 1-7, wherein the sounding signal is to be transmitted after transmitting Null Data Packet Announcement (NDPA), which is used to indicate the structure of the sounding signal to be transmitted.

Example 9 comprises the subject matter of any variation of any of examples 1-3 and 7-8, wherein the apparatus is any one of access point (AP), station, and cellular base station.

Example 10 comprises the subject matter of any variation of any of examples 4-6, wherein the apparatus is configured as an AP or cellular base station, and wherein the processing circuitry is configured to: encode the sounding signal in response to an uplink sounding signal received from a station.

Example 11 is a method performed by a wireless enabled apparatus, comprising: encoding a sounding signal, wherein the sounding signal comprises a plurality of sounding symbols, the repetition of sounding symbols to be transmitted in sequence is avoided.

Example 12 comprises the subject matter of any variation of example 11, wherein the step of encoding further comprising: applying zero-prefix for each sounding symbol to avoid intra symbol repetition; applying masking sequence different from each other for each sounding symbol to avoid inter symbol repetition.

Example 13 comprises the subject matter of any variation of example 11 or 12, wherein the apparatus comprises two or more antennas, the method further comprising each of the antennas is to transmit encoded sounding symbols based on the plurality of sounding symbols, wherein for each antenna, the encoded sounding symbols in different time slots are different, wherein for each time slot, the encoded sounding symbols on the two or more antennas are repeated, with different global phases determined by a general phase matrix.

Example 14 comprises the subject matter of any variation of any of examples 11-13, further comprising encoding the sounding signal for two or more users and transmitting the encoded sounding signal to the two or more users, wherein the sounding symbols for different users are transmitted over different time slots and/or over different frequencies.

Example 15 comprises the subject matter of any variation of example 14, wherein all sounding symbols for a first user are followed by any sounding symbol for a second user.

Example 16 comprises the subject matter of any variation of example 14, wherein the sounding symbols for different users are to be transmitted in an interleaved approach, wherein transmitting of the sounding symbols for different users comprising: transmitting a first number of sounding symbol for a first user; transmitting a second number of sounding symbol for a second user; transmitting a third number of sounding symbol for the first user; and transmitting a fourth number of sounding symbol for the second user.

Example 17 comprises the subject matter of any variation of any of examples 11-16, the method further comprising: recording the Time of Departure (ToD) information of the sounding signal; obtaining the Time of Arrival (ToA) information of the sounding signal from a receiving device; calculating the distance between the apparatus and the receiving device based on at least the ToD information and the ToA information; and encoding an unlocking signal if the calculated distance is less than a predetermined threshold, to unlock a locked device.

Example 18 comprises the subject matter of any variation of any of examples 11-17, wherein the sounding signal is to be transmitted after transmitting Null Data Packet Announcement (NDPA), which is used to indicate the structure of the sounding signal to be transmitted.

Example 19 comprises the subject matter of any variation of any of examples 11-13 and 17-18, wherein the apparatus is any one of access point (AP), station, and cellular base station.

Example 20 comprises the subject matter of any variation of any of examples 14-16, wherein the apparatus is configured as an AP or cellular base station, and wherein the step of encoding a sounding signal further comprising: encoding the sounding signal in response to an uplink sounding signal received from a station.

Example 21 is a non-transitory computer readable medium, having stored thereon instructions, which when executed cause a computing device to perform the method according to any one of examples 11-20.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A device, the device comprising processing circuitry coupled to storage, the processing circuitry configured to:
   determine a frame associated with a sounding signal, wherein the frame comprises a legacy preamble and one or more fields;
   determine a first field comprising a plurality of sounding symbols, wherein the plurality of sounding symbols are associated with long training field (LTF) sequences;
   apply a zero-prefix to each of the sounding symbols;
   convert a first sounding symbol of the plurality of the sounding symbols to a first random sounding symbol by applying a first masking sequence to the first sounding symbol;
   convert a second sounding symbol of the plurality of the sounding symbols to a second random sounding symbol by applying a second masking sequence to the second sounding symbol;
   encode the sounding signal for two or more station devices, wherein the sounding signal comprises the first sounding symbol and the second sounding symbol; and
   cause to send the frame comprising the sounding signal to the two or more station devices to perform a ranging procedure based on the plurality of sounding symbols.

2. The device of claim 1, wherein the LTF sequences are based on applying a sequence of bits to each of the sounding symbols.

3. The device of claim 1, wherein the processing circuitry is further configured to:
   determine a first plurality of sounding symbols associated with a first user;
   determine a second plurality of sounding symbols associated with a second user; and
   cause to send the second plurality of sounding symbols after sending the first plurality of the second symbols.

4. The device of claim 1, wherein the apparatus comprises two or more antennas, each of the antennas is to transmit encoded sounding symbols based on the plurality of sounding symbols.

5. The device of claim 1, wherein the encoded sounding symbols are repeated.

6. The device of claim 1, further comprising a transceiver configured to transmit and receive wireless signals.

7. The device of claim 6, further comprising an antenna coupled to the transceiver to cause to send the frame.

8. A non-transitory computer-readable medium storing computer-executable instructions which when executed by one or more processors result in performing operations comprising:
   determining a frame associated with a sounding signal, wherein the frame comprises a legacy preamble and one or more fields;
   determining a first field comprising a plurality of sounding symbols, wherein the plurality of sounding symbols are associated with long training field (LTF) sequences;
   applying a zero-prefix to each of the sounding symbols;
   converting a first sounding symbol of the plurality of the sounding symbols to a first random sounding symbol by applying a first masking sequence to the first sounding symbol;
   converting a second sounding symbol of the plurality of the sounding symbols to a second random sounding symbol by applying a second masking sequence to the second sounding symbol;
   encoding the sounding signal for two or more station devices, wherein the sounding signal comprises the first sounding symbol and the second sounding symbol; and
   causing to send the frame comprising the sounding signal to the two or more station devices to perform a ranging procedure based on the plurality of sounding symbols.

9. The non-transitory computer-readable medium of claim 8, wherein the LTF sequences are based on applying a sequence of bits to each of the sounding symbols.

10. The non-transitory computer-readable medium of claim 8, wherein the operations further comprise:
    determining a first plurality of sounding symbols associated with a first user;
    determining a second plurality of sounding symbols associated with a second user; and
    causing to send the second plurality of sounding symbols after sending the first plurality of the second symbols.

11. The non-transitory computer-readable medium of claim 8, wherein the apparatus comprises two or more antennas, each of the antennas is to transmit encoded sounding symbols based on the plurality of sounding symbols.

12. The non-transitory computer-readable medium of claim 8, wherein the encoded sounding symbols are repeated.

13. A method comprising:
    determining a frame associated with a sounding signal, wherein the frame comprises a legacy preamble and one or more fields;
    determining a first field comprising a plurality of sounding symbols, wherein the plurality of sounding symbols are associated with long training field (LTF) sequences;
    applying a zero-prefix to each of the sounding symbols;
    converting a first sounding symbol of the plurality of the sounding symbols to a first random sounding symbol by applying a first masking sequence to the first sounding symbol;
    converting a second sounding symbol of the plurality of the sounding symbols to a second random sounding symbol by applying a second masking sequence to the second sounding symbol;
    encoding the sounding signal for two or more station devices, wherein the sounding signal comprises the first sounding symbol and the second sounding symbol; and causing to send the frame comprising the sounding signal to the two or more station devices to perform a ranging procedure based on the plurality of sounding symbols.

14. The method of claim 13, wherein the LTF sequences are based on applying a sequence of bits to each of the sounding symbols.

\* \* \* \* \*